(12) United States Patent
Lim

(10) Patent No.: US 7,967,331 B2
(45) Date of Patent: Jun. 28, 2011

(54) PASSENGER AIRBAG STRUCTURE OF VEHICLE

(75) Inventor: Kyungtaek Lim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 12/274,050

(22) Filed: Nov. 19, 2008

(65) Prior Publication Data

US 2009/0152853 A1 Jun. 18, 2009

(30) Foreign Application Priority Data

Dec. 15, 2007 (KR) ........................ 10-2007-0131793

(51) Int. Cl.
*B60R 21/23* (2006.01)
*B60R 21/233* (2006.01)
(52) U.S. Cl. ...................... 280/729; 280/740; 280/743.2
(58) Field of Classification Search .................. 280/740, 280/743.2, 742, 743.1, 729, 732
See application file for complete search history.

(56) References Cited

U.S. PATENT DOCUMENTS

| | | | | |
|---|---|---|---|---|
| 5,282,646 A | * | 2/1994 | Melvin et al. | 280/729 |
| 6,302,433 B1 | * | 10/2001 | Ellerbrok et al. | 280/729 |
| 7,360,789 B2 | * | 4/2008 | Bito | 280/743.1 |
| 7,762,576 B2 | * | 7/2010 | Cho | 280/729 |
| 2002/0175511 A1 | * | 11/2002 | Dunkle et al. | 280/743.2 |
| 2006/0131846 A1 | * | 6/2006 | Abe | 280/729 |
| 2006/0186655 A1 | * | 8/2006 | Ehrke | 280/743.1 |
| 2007/0108750 A1 | * | 5/2007 | Bauer et al. | 280/740 |
| 2007/0252369 A1 | * | 11/2007 | Thomas | 280/740 |
| 2008/0073893 A1 | * | 3/2008 | Schneider | 280/740 |

FOREIGN PATENT DOCUMENTS

| | | |
|---|---|---|
| JP | 10-203281 A | 8/1998 |
| JP | 2000-108828 A | 4/2000 |
| JP | 2007-45241 A | 2/2007 |
| KR | 10-2005-0101977 A | 10/2005 |
| KR | 10-2006-0070084 A | 6/2006 |
| KR | 10-0747379 B1 | 8/2007 |

* cited by examiner

*Primary Examiner* — Paul N. Dickson
*Assistant Examiner* — George D. Spisich
(74) *Attorney, Agent, or Firm* — Morgan, Lewis & Bockius LLP

(57) ABSTRACT

The present invention provides a passenger airbag structure that prevents an airbag cushion from directly shocking a child in a passenger seat to secure safety of the child by controlling the flow of an inflation gas in an early inflation of the airbag cushion and has the same of improved performance in protecting an adult by inflating the airbag cushion in the same shape as in the related art, when the airbag cushion has completely inflated.

16 Claims, 6 Drawing Sheets

PASSENGER AIRBAG STRUCTURE OF VEHICLE

CROSS-REFERENCE TO RELATED APPLICATION

The present application claims priority to Korean Application Number 10-2007-0131793 filed Dec. 15, 2007, the entire contents of which application is incorporated herein for all purposes by this reference.

BACKGROUND OF THE INVENTION

1. Field of the Invention

The present invention relates to a passenger airbag structure of a vehicle, particularly an airbag that effectively protects a child in a passenger seat in consideration of his/her position, as well as an adult.

2. Description of Related Art

Referring to FIGS. 1 and 2 illustrating the operation of a passenger airbag in the related art, an airbag cushion 504 is inflated by a gas that is discharged out of an inflator 502 in an airbag housing 500 and a tether 506 in airbag cushion 504 controls the inflation shape of airbag cushion 504.

However, the inflation shape of the above passenger airbag is designed to protect an adult and thus relatively insufficient to protect a child, probably shocking the child, instead.

That is, infants or children under 10 years old generally sit closer to a crash pad 508 as compared with adults, such that the head and neck are shocked and damaged first by inflated airbag cushion 504 in this position, even before airbag cushion 504 completely inflates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a passenger airbag structure of a vehicle that prevents an airbag cushion from directly shocking a child in a passenger seat by controlling the flow of an inflation gas in an early inflation of the airbag cushion and has the same of improved performance in protecting an adult by inflating the airbag cushion in the same shape as in the related art, when the airbag cushion has completely inflated.

A passenger airbag structure of a vehicle according to an exemplary embodiment of the invention includes an airbag housing, a gas guide tether, a cushion tether, and a gas flow turning member. The airbag housing is disposed inside a crash pad such that an airbag cushion inflates upwards. The gas guide tether is disposed in the airbag cushion and guides an inflation gas upwards from the airbag housing. The cushion tether has one end attached to the gas guide tether and the other end attached to the airbag cushion. The gas flow turning member changes the flow of the inflation gas by deforming the gas guide tether using a force applied by the cushion tether, when airbag cushion has completely inflated.

The gas guide tether may be made of a more stiff material than the airbag cushion and the cushion tether and guide the inflation gas upwards, with both ends attached to the cushion tether.

It is preferable that the gas guide tether has both end connected to the cushion tether in the up-down direction while being inclined to the passenger from an opening of the airbag housing The gas flow turning member may include cutting lines and a protection portion. The cutting lines are formed at both sides of the attached portion of the cushion tether to the gas guide tether such that they tear with inflation of the airbag cushion. The protection portion is provided to the gas guide tether to limit the tearing range by the cutting lines of the gas guide tether.

The end of the cushion tether may be connected to the gas guide tether, closer to an inflator than the protection portion, the cutting line may be formed in a U-shape of which both ends linearly extend from the portion where the end of the cushion tether is connected to the gas guide tether to the position where the protection portion is disposed, and the protection portion may be fixed to the gas guide tether, perpendicular to the length direction of the cushion tether, while having a length to pass both ends of the cutting line, which linearly extend.

The length of the cushion tether is determined such that the gas guide tether is torn along the cutting line to allow the inflation gas to flow through the cut portion of the gas guide tether when the airbag cushion inflates toward the passenger sitting on the passenger seat with the back leaning on the seat back, and such that the cutting line is not torn when inflation of the airbag cushion toward the rear of the vehicle is prevented at a predetermined level by a passenger who sits at the front portion of the passenger seat relatively close to the crash pad, such as a child.

The gas guide tether may be sewn to the airbag cushion and the cushion tether may be sewn to the gas guide tether and the airbag cushion.

According to a passenger airbag structure of the present invention, it is possible to prevent an airbag cushion from directly shocking a child in a passenger seat to secure safety of the child by controlling the flow of an inflation gas in an early inflation of the airbag cushion and has the same of improved performance in protecting an adult by inflating the airbag cushion in the same shape as in the related art, when the airbag cushion has completely inflated.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
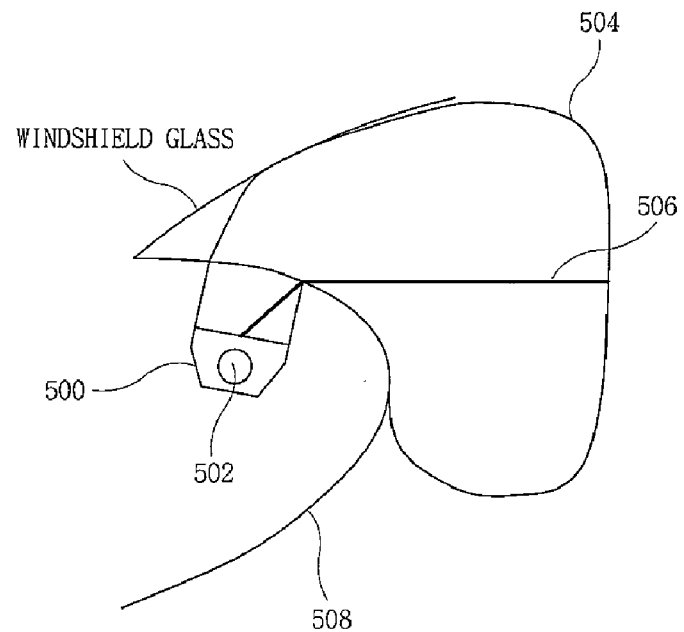
FIGS. 1 and 2 are views illustrating a passenger airbag structure of a vehicle in the related art.
Figure 2:
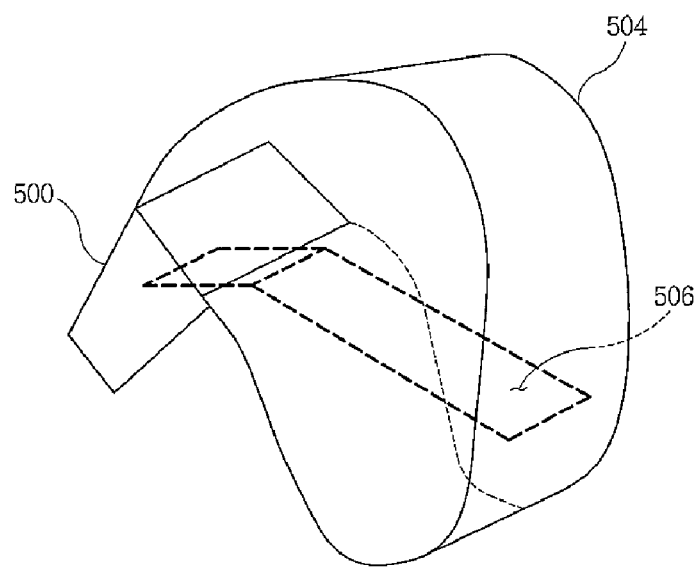
Figure 3:
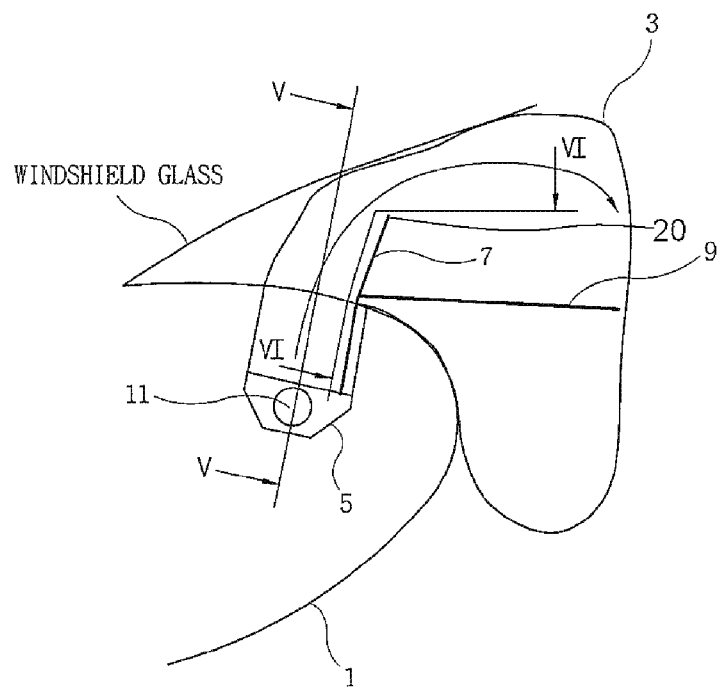
FIGS. 3 and 4 are views illustrating an early inflation of an exemplary airbag cushion in a passenger airbag structure of a vehicle according to the present invention.
Figure 4:
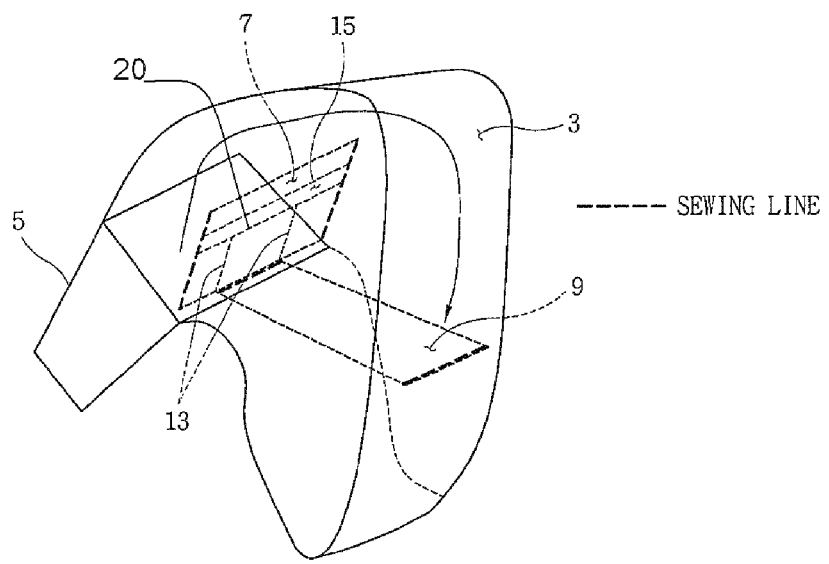
Figure 5:
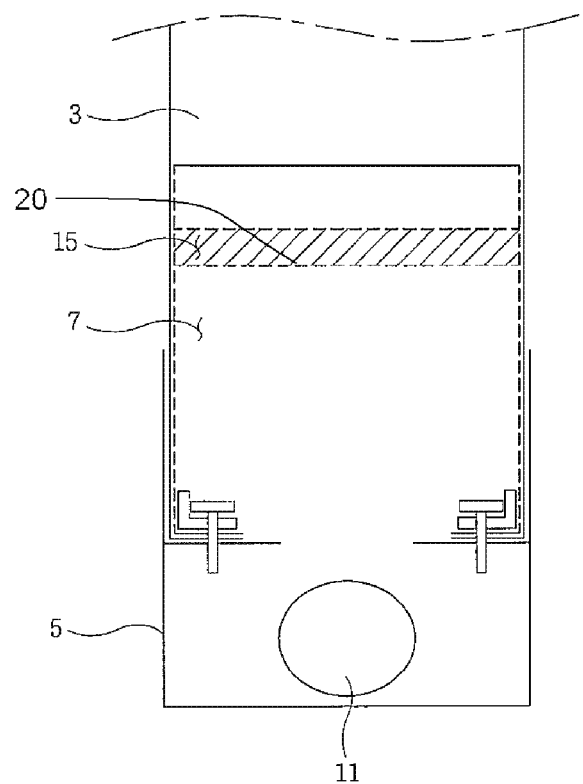
FIG. 5 is a cross-sectional view of the airbag cushion of FIG. 3 taken along the line V-V of FIG. 3.

Referring to FIGS. 3 to 5, an airbag structure according to various embodiments of the present invention includes an airbag housing 5 that is disposed inside a crash pad 1 such that an airbag cushion 3 inflates upwards, a gas guide tether 7 that is disposed in airbag cushion 3 and guides an inflation gas substantially upwards from the airbag housing 5, a cushion tether 9 with one end attached to gas guide tether 7 and the other end attached to airbag cushion 3, and/or a gas flow turning member that changes the flow of the inflation gas by deforming gas guide tether 7 using a force applied by cushion tether 9, when airbag cushion 3 has inflated.

In the above configuration, it is described that airbag cushion 3 inflates upwards from airbag housing 5. In various embodiments of the present invention, in an early stage of inflation, airbag cushion 3 may inflate substantially upwards and then backwards from airbag housing 5, not exactly vertically, such as in the related art, to protect a passenger in the passenger seat behind the airbag housing 5.

Accordingly, it may be possible to make an inflation shape for an adult in time, by guiding the inflation gas from inflator 11 using gas guide tether 7 such that the inflation gas does press airbag cushion 3 upwards and backwards in an early inflation of airbag cushion 3 and then make an inflation shape for a child in time by allowing the inflation gas to inflate lower portion of the airbag cushion 3 smoothly through an opening of the gas guide tether 7 made by using the gas flow turning member in the complete inflation of airbag cushion 3 as explained hereinafter.

Gas guide tether 7 is made of a more stiff material than airbag cushion 3 and cushion tether 9 and guides the inflation gas upwards.

In various embodiments, gas guide tether 7, that is, may be formed of Nylon 66 of denier 420 and thickness=2 mm.

Lateral sides of the gas guide tether 7 are attached to inner lateral sides of the airbag cushion 3 in the up-down direction while being inclined to the passenger from an opening of the airbag housing as shown in FIG. 3.

The gas guide tether 7 is high enough to form an opening between the airbag cushion 3 and the upper portion of the gas guide tether 7 to permit air to flow into the airbag cushion 3.

The width of the cushion tether 9 may be smaller than that of the gas guide tether 7 as shown in FIG. 4 and a bottom line 20 of the cushion tether 9 may be attached at an upper portion of the gas guide tether 7 in a traverse direction thereof, wherein the bottom line 20 functions as a rotation axis in an inflation as explained later. The other portion of the cushion tether 9 is attached to another inner side of the airbag cushion 3.

According to various embodiments of the present invention, the gas flow turning member includes cutting lines 13 and a protection portion 15.

The cutting lines 13 is formed on the gas guide tether 7 and lower portion of the cushion tether 9 is attached to the gas guide tether 7 along the cutting lines 13 such that they tear with inflation of airbag cushion 3.

The protection portion 15 may be provided to gas guide tether 7 to limit the tearing range of cutting lines 13 of gas guide tether 7.

As a tensile force is exerted in cushion tether 9 with inflation of airbag cushion 3, the cutting lines of the gas guide tether 7 are torn by the cushion tether 9 and then the inflation gas can flow through the opening made by the torn portion.

Cutting line 13 is formed by making a plurality of small holes in a line through gas guide tether 7 and is preferably torn under about a force of 0.1 kN or more.

Figure 6:
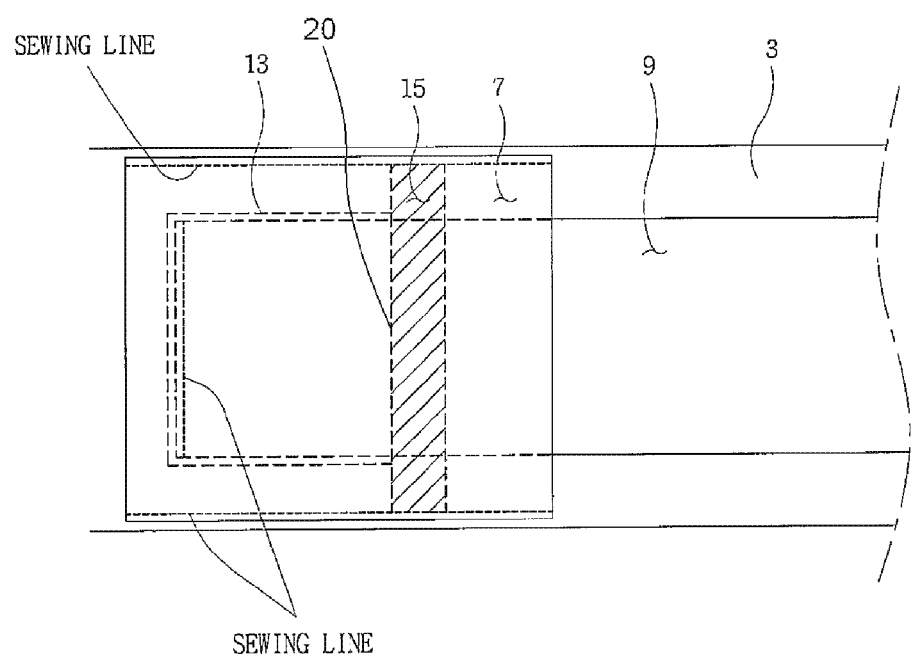
FIG. 6 is a cross-sectional view of the airbag cushion of FIG. 3 taken along the line VI-VI of FIG. 3.

Further, protection portion 15 is attached to gas guide tether 7 as shown in FIG. 6 and Nylon66 of denier 660 and thickness=1 mm. may be enough as a material for protection portion 15.

Gas guide tether 7 is sewn to inner lateral sides of airbag cushion 3 and cushion tether 9 is sewn to gas guide tether 7 and airbag cushion 3.

In detail, a bottom line 20 of the cushion member 9 is attached at an upper portion of the gas guide tether 7 in a traverse direction thereof as explained above. The bottom line 20 of the cushion tether 9 may be positioned on or near to the protection portion 15. Furthermore, a lower portion of the cushion tether 9 is attached along the cutting line 13 so that at least a portion that the lower portion, not the bottom line 20, of the cushion tether 9 is connected to the gas guide tether 7, closer to the inflator 11 than the protection portion 15.

The cutting line 13 is formed in a U-shape of which both ends linearly extend upwards from the above-commented portion where the lower portion of the cushion tether 9 is connected to the gas guide tether 7 to the protection 15, in various embodiments of the present invention and the protection portion 15 is fixed to the gas guide tether 7, perpendicular to the length direction of the cushion tether 9, while having a length to range both ends of the cutting line, which linearly extend.

The length of the cushion tether 9 is determined such that the gas guide tether 7 is torn along the cutting line 13 to allow the inflation gas to flow through the opening of the gas guide tether 7 when the airbag cushion inflates toward the passenger sitting on the passenger seat with the back leaning on the seat back (e.g. a general adult). The cutting line 13 is not torn when inflation of the airbag cushion 3 toward the rear of the vehicle is prevented at a predetermined level by a passenger who sits at the front portion of the passenger seat relatively close to the crash pad, such as a child.

The operation of airbag cushion having the above configuration is described hereafter with reference to FIGS. 3, 4, and 7 to 10.

In the early inflation of airbag cushion 3, that is, at 20 ms from start of inflation, as shown in FIGS. 3 and 4, the inflation gas discharged out of inflator 11 is mainly guided upwards by gas guide tether 7 and flows through only a predetermined passage to inflate airbag cushion 3.

Figure 9:
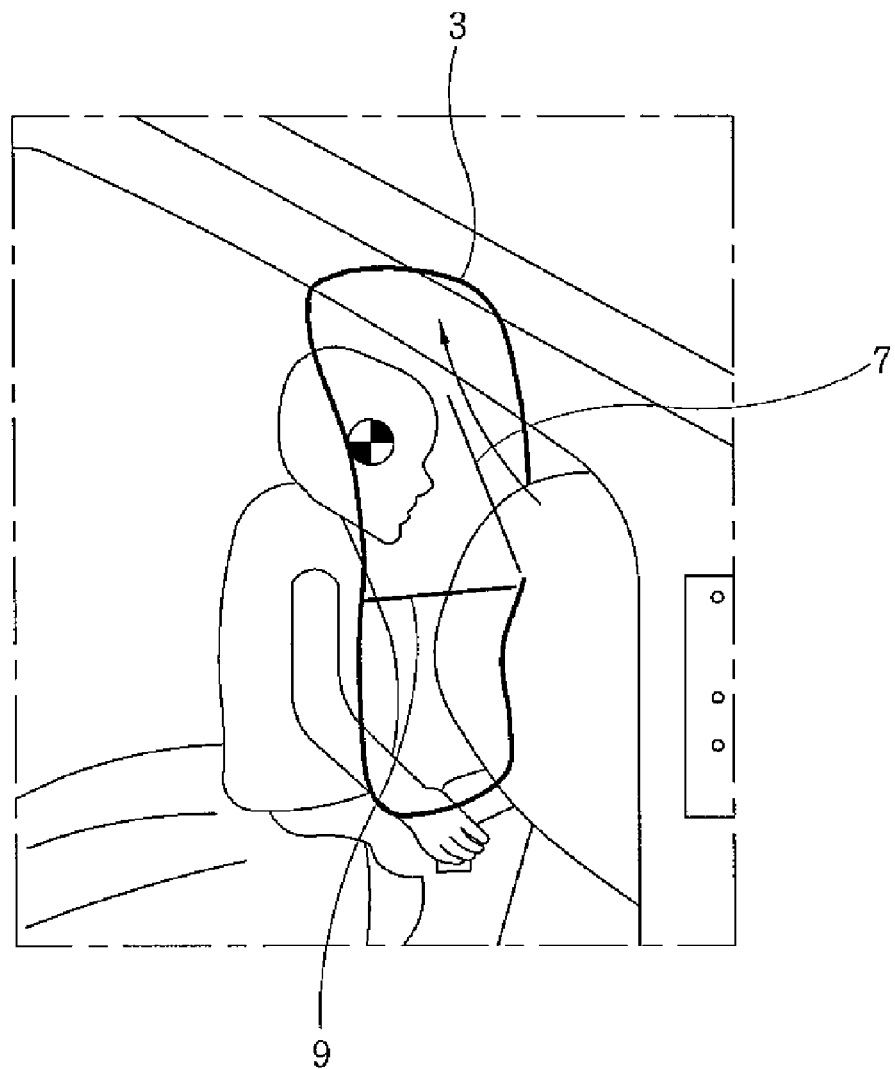
FIG. 9 is a view illustrating a protection mechanism for a child according to the present invention.

In the above state, the kinetic energy of the inflation gas is mainly exerted upwards and airbag cushion 3 correspondingly inflates upwards and backwards, such that a passenger sits relatively close to crash pad 1, such as a child, is not directly shocked by the inflation gas. Therefore, as shown in FIG. 9, a child can be safely protected.

When the airbag cushion 3 inflates toward the passenger sitting close to the crash pad 1, such as a child, the airbag cushion 3 does not inflate further to the passenger, such that a tensile force to tear the gas guide tether 7 is not applied to the cushion tether 9. Therefore, a majority of the inflation gas flows upwards, such that it is possible to continuously ensure that the airbag cushion 3 inflating does not directly hit the passenger, such as a child.

Figure 7:
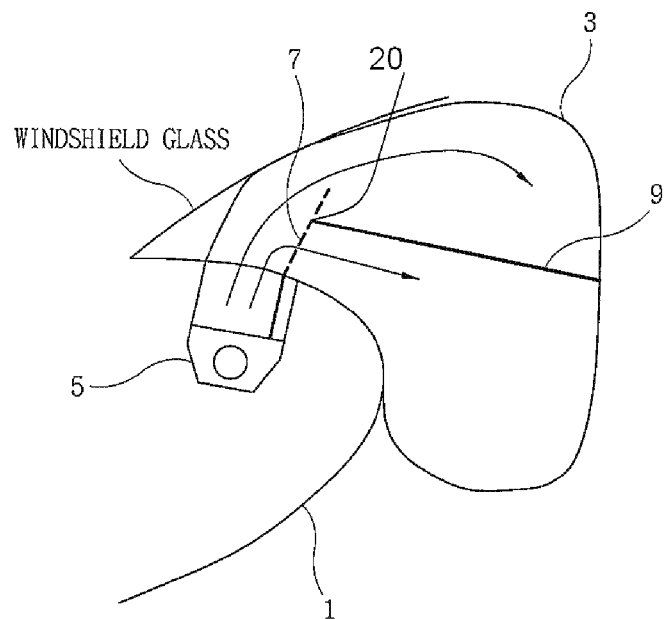
FIGS. 7 and 8 views illustrating an exemplary airbag cushion, which has completely inflated, in a passenger airbag structure of a vehicle according to the present invention.
Figure 8:
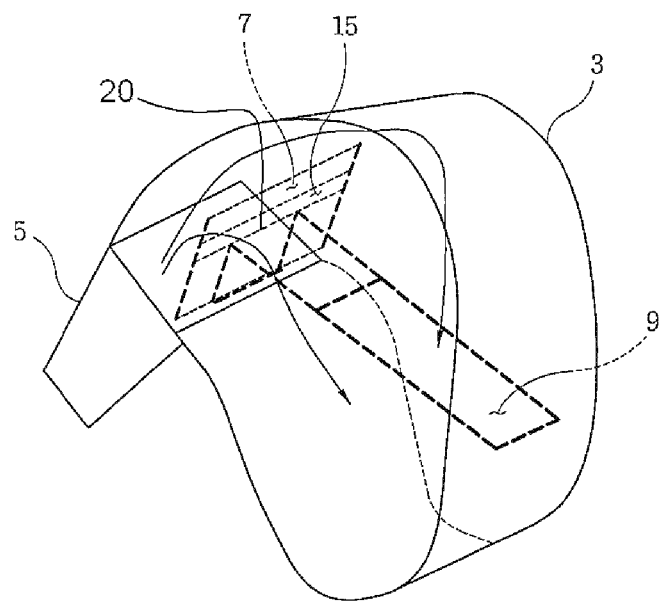

Further, referring to FIGS. 7 and 8 showing that airbag cushion 3 has completely inflated at 50 ms from the start of inflation of the airbag, as gas guide tether 7 is torn by the cushion tether 9 and further extends with the lower portion rotated with respect to the bottom line 20 as a rotation axis to make an opening on the gas guide tether 7, the inflation gas inflates airbag cushion 3, flowing through the opening of the torn portion.

Figure 10:
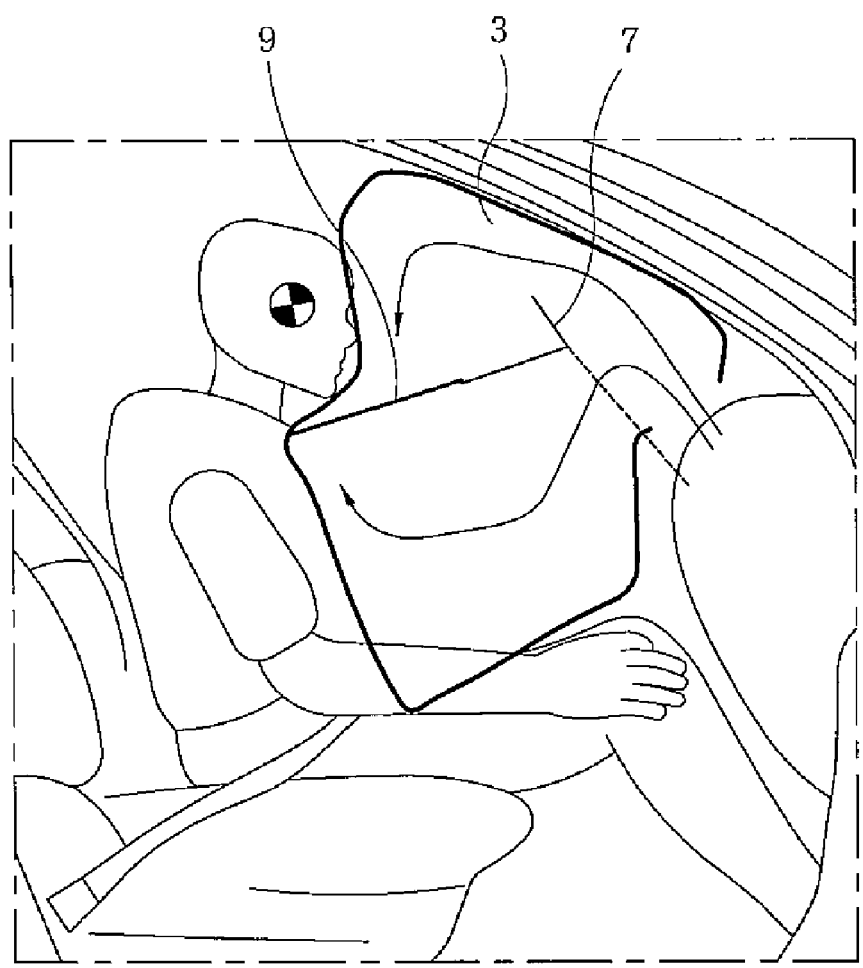
FIG. 10 is a view illustrating a protection mechanism for an adult according to the present invention.

That is, because the inflation gas discharged out of inflator 11 is guided upwards, but also flows through the opening formed by tearing of gas guide tether 7, airbag cushion 3 inflates into the optimal shape for adults in time as in the related art, such that it can also sufficiently protect an adult as shown in FIG. 10.

Further, it is possible to considerably reduce a shock applied to adults by airbag cushion 3 inflating because gas guide tether 7 tears and absorbs the inflation force of airbag cushion.

For convenience in explanation and accurate definition in the appended claims, the terms "upper" or "lower", "front", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A passenger airbag structure of a vehicle, comprising:
an airbag housing that is disposed inside a crash pad such that an airbag cushion inflates upwards therethrough;
a gas guide tether attached to the airbag housing and to the inside of the airbag cushion and guiding an inflation gas upwards from the airbag housing;
a cushion tether with one end attached to the inflation gas guide tether and the other end attached to the inside of the airbag cushion; and
a gas flow turning member that branches off flow of the inflation gas by deforming the gas guide tether using a force applied by the cushion tether after the airbag cushion starts to inflate, wherein the gas flow turning member includes:
a cut line formed on the gas guide tether and a lower portion of the cushion tether is attached along the cut line of the gas flow turning member such that the cut line is torn from the gas guide tether by the cushion tether with inflation of the airbag cushion; and
a protection portion provided to the gas guide tether to limit tearing range of the cut line; and
wherein the cut line is formed in a U-shape of which both ends linearly extend from a portion where a bottom line of the lower portion of the cushion tether is connected to the gas guide tether, to the protection portion of the gas flow turning member.

2. The passenger airbag structure of the vehicle as defined in claim 1, wherein the gas guide tether is stiffer than the airbag cushion and the cushion tether.

3. The passenger airbag structure of the vehicle as defined in claim 2, wherein the gas guide tether is formed of Nylon 66 of denier 420 and thickness is about 2 mm.

4. The passenger airbag structure of the vehicle as defined in claim 1, wherein the gas guide tether has both lateral sides connected to the airbag cushion in the up-down direction while being inclined to a passenger from an opening of the airbag housing.

5. The passenger airbag structure of the vehicle as defined in claim 1, wherein the height of the gas guide tether is sufficient enough to form an air passage between the airbag cushion and the gas guide tether to permit the inflation gas to flow into a forward portion of the airbag cushion.

6. The passenger airbag structure of the vehicle as defined in claim 1, wherein a width of the cushion tether is smaller than that of the gas guide tether to permit air to flow into the airbag cushion between the cushion tether and the airbag cushion.

7. The passenger airbag structure of the vehicle as defined in claim 1, wherein the cut line is formed in a U-shape.

8. The passenger airbag structure of the vehicle as defined in claim 1, wherein the cut line is formed by making a plurality of small holes in a line through the gas guide tether.

9. The passenger airbag structure of the vehicle as defined in claim 1, wherein the cut line is torn under about a force of 0.1 kN or more.

10. The passenger airbag structure of the vehicle as defined in claim 1, wherein the cushion tether rotates about the bottom line thereof after the cut line is torn by the cushion tether in inflation of the airbag cushion.

11. The passenger airbag structure of the vehicle as defined in claim 1, wherein the length of the cushion tether is determined
in such a manner that the gas guide tether is torn along the cut line to allow the inflation gas to flow through a cut portion of the gas guide tether when the airbag cushion inflates toward the passenger sitting on the passenger seat with the back leaning on the seat back, and
in such a manner that the cut line is not torn when inflation of the airbag cushion toward the rear of the vehicle is prevented at a predetermined level by a passenger who sits at the front portion of the passenger seat relatively close to the crash pad, such as a child.

12. The passenger airbag structure of the vehicle as defined in claim 1, wherein the bottom line of the cushion tether is connected to the gas guide tether.

13. The passenger airbag structure of the vehicle as defined in claim 1, wherein the protection portion is fixed to the gas guide tether in traverse direction thereof.

14. The passenger airbag structure of the vehicle as defined in claim 1, wherein the protection portion has a length to extend beyond both distal ends of the cut line, which linearly extends in the traverse direction thereof.

15. The passenger airbag structure of the vehicle as defined in claim 1, wherein the protection portion is made of Nylon66 of denier 660 and thickness is about 1 mm.

16. A passenger vehicle comprising a windshield, the crash pad, and the passenger airbag structure of the vehicle as defined in claim 1.

* * * * *